United States Patent Office 3,063,882
Patented Nov. 13, 1962

---

3,063,882
TREATMENT OF POLYMERIC SHAPED STRUCTURES
John Rutledge Cheshire, Centerville, Del., assignor to E. I. du Pont de Nemours and Company, Wilmington, Del., a corporation of Delaware
No Drawing. Filed June 13, 1958, Ser. No. 741,718
19 Claims. (Cl. 154—43)

This invention relates to the treatment of shaped structures of polymeric perfluorocarbon resins and, more particularly, to the treatment of flexible films and sheets of these resins.

As used in the present specification polymeric perfluorocarbon resins include polytetrafluoroethylene, polyhexafluoropropene, polyperfluoroallene and copolymers of polytetrafluoroethylene with hexafluoropropene, perfluoropentene-1, perfluorohexene-1, perfluoroheptene-1, perfluorooctene-1, perfluorononene-1, perfluorocyclobutene. In short, these polymeric compounds are composed of fluorine and carbon only, and have sufficient high molecular weights to permit the formation of shaped structures such as films.

Perfluorocarbon polymers are well known for their resistance to most chemicals and solvents. Their use as liners for pipes and vessels in which corrosive chemicals are transported or stored is at once apparent. However, the perfluorocarbon polymers suffer from an extremely low degree of adherability to all materials including low adherability to other perfluorocarbon polymeric structures. The use of the common adhesives does not provide adequate bonding of these polymers to anything.

The object of the present invention therefore is to alter the above-described situation—to prepare structures of perfluorocarbon polymers, particularly in the form of self-supporting films and film coatings, that adhere readily to surfaces of other materials and to other perfluorocarbon polymeric structures without adversely affecting the useful properties of the polymers. A more specific object is a process that produces a cementable polymeric perfluorocarbon resin structure that retains its useful chemical-resistant properties. A further object is to provide a process that lends itself to the rapid, efficient treatment of a continuous moving web of film and the like. Other objects will appear hereinafter.

While the invention will be described primarily as a treatment for flexible film and sheeting, it should be understood that other shaped structures such as rods, tubes, filaments, filaments in the form of woven or non-woven fabrics, etc. may be similarly treated.

The objects are accomplished by a process which comprises heating the surface of the polymeric perfluorocarbon structure to a temperature of at least 150° C. in the presence of an oxidizing agent and an amine selected from the group consisting of
(A) an amine containing at least one group of the formula

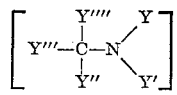

and
(B) an amine containing at least one group of the formula (B)      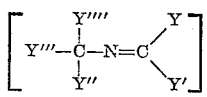

wherein Y, Y', Y'', Y''' and Y'''' are selected from the group consisting of hydrogen, carbon and nitrogen.

The resulting treated perfluorocarbon polymeric products have been found to be easily adhered to metals such as aluminum, iron, copper, magnesium, nickel, tin, lead, and alloys thereof; glass; cellulosic structures such as wood, regenerated cellulose film; and other polymeric structures such as polyesters, polyamides, polychlorotrifluoroethylene and other fluorine-containing halogenated polyethylenes.

Adhesion may be obtained by using any of the common adhesives. The more useful adhesives include the epoxy resins such as R–313,[1] "Hysol" 2040,[2] "Bondmaster" 648;[3] the acrylate adhesives disclosed in U.S. Patent 2,464,826; and the crotonate, methacrylate, alpha-chloroacrylate, sorbate and fumarate adhesive; silicone based adhesives such as "Flexrock" No. 80,[4] C–269 Adhesive;[5] modified synthetic rubber type adhesive such as 4684;[6] and polyester type adhesives such as 46950, 46960, 46970 and 46971.[6]

The resulting laminated products display peeling bond strengths of at least 100 grams per inch of width and as high as 7,500 grams per inch depending upon the particular base materials used, the adhesive employed, and the extent to which the treatment of the present invention is carried out.

Perfluorocarbon Resins Useful in the Present Invention

Some of the polymeric perfluorocarbon resins useful in the present invention have been disclosed previously. The preferred resins are polytetrafluoroethylene, polyhexafluoropropene and copolymers of tetrafluoroethylene and hexafluoropropene. Polytetrafluoroethylene is available commercially as "Teflon" TFE-fluorocarbon resin and will be referred to hereinafter as "Teflon." Polyhexafluoropropene is described in U.S. patent application Serial No. 677,212, filed August 9, 1957, to H. S. Eleuterio, which issued November 1, 1960, as U.S. Patent 2,958,685. Copolymers of tetrafluoroethylene with hexafluoropropene are described in U.S. Patents 2,468,664 and 2,549,935, and in U.S. patent applications Serial No. 649,451, filed March 29, 1957, to M. I. Bro and B. W. Sandt, which issued July 26, 1960, as U.S. Patent 2,946,763, and Serial No. 649,314, filed March 29, 1957, to R. S. Mallouk and B. W. Sandt, which issued October 4, 1960, as U.S. Patent 2,955,099. A suitable polyperfluoroallene resin for use in the present invention is described in U.S. patent application Serial No. 671,131, filed July 11, 1957, to T. L. Jacobs and R. S. Bauer. Copolymers of tetrafluoroethylene and perfluorocyclobutene for use in this invention are described in U.S. Patent No. 2,511,258. The copolymers of tetrafluoroethylene with perfluoropentene-1, perfluorohexene-1, perfluoroheptene-1, perfluorooctene-1, and perfluorononene-1, for use in the present invention are described in U.S. patent application Serial No. 627,570, filed December 11, 1956, to M. I. Bro, which issued June 28, 1960, as U.S. Patent 2,943,080.

Amines Useful in the Present Invention

The amines suitable for use in the process of this invention contain at least one group having either the formula ---
[1] Manufactured by C. H. Biggs Corp., Los Angeles, California.
[2] Manufactured by Houghton Laboratories, Inc., Olean, N.Y.
[3] Manufactured by Rubber and Asbestos Corp., Bloomfield, N.J.
[4] Manufactured by Flexrock Co., Philadelphia, Pa.
[5] Manufactured by Dow Corning Corp., Midland, Mich.
[6] Manufactured by E. I. du Pont de Nemours & Co., Wilmington, Del.

(A) 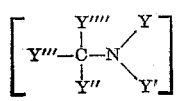

or the formula (B) 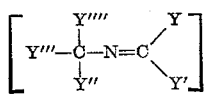

wherein Y, Y', Y'', Y''' and Y'''' are selected from the group consisting of carbon, nitrogen and hydrogen. It should be understood, however, that other functional groups, besides the above described nitrogen-containing groups, may be present in the amines used in the present invention.

When both Y and Y' are hydrogen in the amines having at least one group of the Formula A, the compounds embraced are primary aliphatic amines, diamines and their derivatives, e.g., t-butyl amine, ethanolamine, hexamethylene diamine, etc.; primary alicyclic amines and their derivatives, e.g., cyclohexylamine, 4-hydroxycyclohexylamine, etc.; primary aromatic amines, diamines and their derivatives, e.g., alpha-napthylamine, p-aminophenol, p-phenylenediamine, etc.; and amino acids, e.g., deltaaminovaleric acid, etc.

When Y is hydrogen and Y' is carbon in the amines containing at least one group of Formula A, then the following compounds are included: dialkyl amines and their derivatives, e.g., diethylamine, diethanolamine, etc.; diaryl amines and their derivatives, e.g., diphenylamine, N-phenyl-p-toluamine, etc.; mixed alkyl aryl amines and their derivatives, e.g., phenylethylamine, N-ethyl-p-toluamine, etc.; pyrrole, pyrrolines, pyrrolidine, indole, piperidine and piperazine, morpholine and their carbon-substituted derivatives.

When both Y and Y' are carbon atoms in Formula A, the amines covered are trialkyl amines and their derivatives, e.g., triethanolamine, trimethylamine, etc.; triaryl amines and their derivatives, e.g., triphenylamine; mixed alkyldiaryl-and aryldialkyl amines; N-substituted derivatives of pyrrole, pyrrolines, pyrrolidine, indole, piperidine and piperazine, morpholine and their carbon-substituted derivatives.

Those amines which contain at least one group of Formula B include pyridine, quinoline, phenanthroline, pyrazine, melamine and their derivatives, etc.

*Oxidizing Agents Useful in the Present Invention*

Any known oxidizing agent may be used in the process of the present invention. The selection of the particular agent to be used will depend on the process technique as will be apparent from the next section of the specification. Among the oxidizing agents that may be used are potassium permanganate, organic and inorganic peroxides, sodium dichromate, air, oxygen, ozone, etc.

*Process Techniques Useful in the Present Invention*

The treatment may be performed according to a variety of techniques, some of which are set forth below. The preferred techniques are those that are easily adapted to continuous processing.

(1) The amine may be applied to the surface of the polymeric perfluorocarbon structure from a solution or in the form of a melt by dipping, spraying, roller coating, printing, etc. The thus-coated surface may then be subjected to a temperature of at least 150° C. in the presence of the oxidizing agent. Wetting agents and thickeners may be incorporated into the solution or melt of the amine prior to application. If liquid or solid oxidizing agents are used, then the oxidizing agent may also be incorporated in the solution or melt. The solution used may be in an inert organic solvent or water. If desired, the amine may be applied as a dispersion in the form of a paste. Or, the amine may be converted to an acid salt and applied as a paste or from solution or in molten form. A process selected from this category is easily adapted to the continuous treatment of one or both surfaces of a moving web of film or sheeting.

(2) The polymeric perfluorocarbon structure may be immersed in the amine, the amine having been heated to a temperature of at least 150° C. A liquid or solid oxidizing agent may be dissolved in the heated amine or a gaseous oxidizer such as oxygen, ozone or air may be bubbled through the amine during treatment. If desired, a wetting agent may be incorporated in the amine. If the amine vaporizes to a substantial extent at the temperature used, then the polymeric perfluorocarbon structure may be exposed to the amine vapors along with air or oxygen and, if necessary, an additional source of heat. The processes in this category are also adaptable to continuous operation. However, they are limited to operation below the normal boiling point of the amine or, in the case of the vapor exposure process, to operation at the boiling point of the amine.

(3) The polymeric perfluorocarbon structure, the amine and the oxidizing agent may all be charged in a pressure vessel, e.g., a shaker tube or rocker bomb. The contents may then be heated to a temperature of at least 150° C. Since this technique can be performed under pressure, temperatures considerably above the normal boiling point of the amine may be used. However, this technique does not lend itself easily to a continuous operation.

Whatever technique is used, it is desirable to confine the treatment to the surface of the polymeric perfluorocarbon structure. Penetration to any substantial extent below the surface will ultimately reduce the structure to a useless charred mass. Penetration of the treatment from the surface into the body of the film may be minimized by reducing the time of exposure to heat and/or by using suitable quenching methods. For example, when both surfaces of a continuously-moving web of film are being treated simultaneously, the heating step may be followed by a step in which the film is conducted through the nip of a pair of driven chill rolls or a step wherein the film is conducted through a bath or under a spray of cold water. Where only one surface of the web is being treated, a chill roll may be used to contact the uncoated surface at a location directly opposite to the location at which the coated surface is exposed to intense heating.

The following examples are intended to provide a clearer understanding of the invention. They should not be construed to limit the scope of the invention in any way.

EXAMPLE 1

A 330 cc. stainless steel-lined shaker tube was charged with a 0.002" thick sample of film (1" x 4") of a copolymer comprising 82–86% by weight of tetrafluoroethylene and 14–18% by weight of hexafluoropropene, and 200 ml. of ethylamine. An air space was left in the tube and the tube was sealed. The tube was then heated to 200° C. for six hours, cooled and discharged.

The film had turned dark brown, but was still quite flexible. The surface of this treated sample was considerably more wettable by water than was the surface of a corresponding untreated control sample.

An adhesive mixture containing R–313 [7] epoxy resin adhesive and about 1% of an amine-type hardener [7] was prepared. The adhesive mixture was applied to one surface of copper and to one surface of the treated film sample. The adhesive-coated surfaces were promptly brought together and the resulting sandwich pressed for 30 minutes at 100° C. under a pressure of approximately 75 pounds per square inch. After being allowed to cool to room temperature, the plies of the

---

[7] Manufactured by C. H. Biggs Corp.

resulting lamination were peeled apart on an Instron tensile tester.

The bond strength in peel exceeded the breaking strength of the film. Bond strengths greater than 3 pounds per inch of sample width were recorded. An attempt was made to adhere an untreated control film to copper in the same manner as described above. The resulting bond strength was zero.

EXAMPLE 2

The procedure of Example 1 was repeated using a 3" x 6" sample of the perfluorocarbon film of Example 1, 100 grams of ethanolamine and an air space above the mixture in the shaker tube. The mixture was heated to 200–205° C. for two hours.

After washing the treated, light brown film sample with water and acetone and drying the sample, it was cut into 1" wide strips. Laminations to copper were prepared as described in Example 1. The bond strengths in peel ranged from 1.5 to 2.5 lbs. per inch of sample width.

EXAMPLES 3—4

The shaker tube of Example 1 was charged with a 2" x 6" sample of 0.01" thick "Teflon" film, one atmosphere of oxygen and for Example 3, 20 grams of p-phenylenediamine; for Example 4, 20 grams of p-phenylenediamine dihydrochloride. In each case the tube was heated to 300° C. for four hours and then cooled. The treated "Teflon" film was removed and washed first with water, then hydrochloric acid, then water again, and finally refluxed with acetone for several hours. The resulting samples were then dried and tested.

Both treated films displayed peeling bond strengths of 2–3 lbs./inch of sample width when cemented to copper in accordance with the procedure described in Example 1.

EXAMPLES 5–13

"Quadrol"[3] (Q) or p-phenylenediamine (p-PDA) and 10-mil thick samples of the perfluorocarbon copolymer described in Example 1 were placed in flasks, each flask fitted with a reflux condenser and a thermometer. Air or the combination of a blanket of nitrogen with various chemicals added to the mixture, as indicated in Table I, were used as the oxidizing agents. Refluxing was carried out at a temperature of about 270° C. for approximately three hours. After washing the samples with water and acetone, then drying, the samples were cemented to copper using R–313 epoxy resin adhesive as described in Example 1. The peeling bond strengths in pounds per inch of sample width are presented in Table I.

As a control, the procedure was repeated using no oxidizing agent. Only a blanket of nitrogen was imposed over a mixture of sample and "Quadrol" and a reflux time of six hours was used.

TABLE I

| Example | Amine | Oxidizing agent | Bond strength (lbs./in.) |
|---|---|---|---|
| Control | 100 ml. Q | None (nitrogen) | 0 |
| 5 | 100 ml. Q | Air | 9–10 |
| 6 | 25 ml. Q | 0.5 gm. potassium permanganate | 9–10 |
| 7 | 25 ml. Q | 0.5 gm. sodium dichromate | 9–10 |
| 8 | 25 ml. p-PDA | 0.5 gm. potassium permanganate | 8–10 |
| 9 | 25 ml. p-PDA | 0.5 gm. sodium dichromate | 8–10 |
| 10 | 25 ml. p-PDA | 0.5 gm. sodium chlorate | 8–10 |
| 11 | 25 ml. p-PDA | 0.5 gm. selenium dioxide | 8–10 |
| 12 | 25 ml. p-PDA | 0.5 gm. chromic oxide | 8–10 |
| 13 | 100 ml. p-PDA | 1.0 gm. potassium permanganate | 8–10 |

[3] N,N,N',N'-tetrakis(2-hydroxypropyl)ethylenediamine manufactured by Wyandotte Chemicals Corp., Wyandotte, Mich.

EXAMPLES 14–17

The refluxing procedure of Example 5 was repeated with similar success using .002" thick samples of the perfluorocarbon copolymer film described in Example 1, air and the amines shown in Table II for Examples 14–16. A 50-mil thick sample, no air, but instead a blanket of nitrogen, and 2%, based on the weight of the amine, of sodium dichromate was refluxed in Example 17 for successful treatment of the perfluorocarbon copolymer film. The amines used, and the temperature and the extent of refluxing are given in Table II.

TABLE II

| Ex. | Amine | Reflux temperature, °C. | Reflux time, hr. |
|---|---|---|---|
| 14 | 300 mls. ethanolamine | 170 | 24 |
| 15 | 300 mls. hexamethylenediamine | 205 | 24 |
| 16 | 30 gms. diallyl melamine[1] | 240–250 | 3 |
| 17 | 1,4-bis(2-hydroxypropyl)-2-methylpiperazine.[2] | 250–280 | 1 |

[1] 500 mls. of diethylene glycol was used as a high boiling solvent vehicle for the diallyl melamine.
[2] Available as "DHP-MP" from Wyandotte Chemicals Corp., Wyandotte, Michigan.

EXAMPLES 18–25

Ten-mil thick samples of skived "Teflon" tape and the amines and oxidizing agents shown in Table III, were added to 100 ml. flasks, each flask fitted with a thermometer and a reflux condenser attached to a nitrogen manifold. Refluxing was performed at the temperatures and for the times indicated in the table. The treated samples were washed with water and acetone, then dried and tested.

Peeling bond strengths of at least 3 pounds per inch of sample width were obtained in all cases when the samples were cemented to copper using the R–313 epoxy resin and the procedure described in Example 1.

TABLE III

| Ex. | Amine | Oxidizing agent | Reflux temperature, °C. | Reflux time, hr. |
|---|---|---|---|---|
| 18 | 50 gms. 4-aminodiphenyl | 0.5 gm. sodium dichromate | 330 | 1 |
| 19 | 28 gms. beta-naphthalamine | 0.5 gm. sodium dichromate | 306 | 5 |
| 20 | 28 gms. beta-naphthalamine | 0.5 gm. potassium permanganate | 306 | 5 |
| 21 | 50 gms. 4,4'-diaminodiphenyl-methane | 2.0 gms. sodium dichromate | 345 | 4 |
| 22 | 50 gms. 4,4'-diaminodiphenyl-methane | 2.0 gms. potassium permanganate | 345 | 4 |
| 23 | 50 gms. alpha-naphthylamine | 2.0 gms. sodium dichromate | 301 | 4 |
| 24 | 50 gms. alpha-naphthylamine | 2.0 gms. potassium permanganate | 301 | 4 |
| 25 | 1,4-bis(2-hydroxypropyl)-2-methyl-piperazine | 2% sodium dichromate | 250–280 | 4 |

EXAMPLES 26–28

Samples of the perfluorocarbon copolymer film described in Example 1 were suspended in a chamber fitted at the top with a reflux condenser and at the bottom with a flask containing 100 mls. of "Quadrol." A gentle stream of air was permitted to circulate through the chamber. The "Quadrol" was heated to about 270° C. to provide vapors which contacted the film samples along with the air stream. Refluxing was permitted to continue for a period of about four hours. The samples were then cooled, washed with acetone and laminated to copper in the manner described in Example 1. The bond strengths to copper averaged about one pound per inch.

For Example 27, the above procedure was repeated using "Teflon" film samples. The resulting bond strengths to copper averaged about one pound per inch also.

For Example 28, film samples of polyhexafluoropropene were exposed to the "Quadrol" vapors for ten minutes. The samples were washed with water and then laminated to one-mil thick polyethylene terephthalate film using Du Pont 4684 [9] adhesive. Laminating con-

[9] A modified synthetic rubber-type thermoplastic adhesive manufactured by E. I. du Pont de Nemours & Co., Wilmington, Delaware.

ditions were ten seconds at 340° F. and 175 pounds per square inch. The lamination was cut into 1-inch wide strips and tested. The peeling bond strengths averaged 430 grams per inch of sample width compared to strengths of only 85 grams per inch when untreated polyhexafluoropropene film samples were laminated to polyethylene terephthalate film in a similar manner.

EXAMPLES 29–41

One-inch square pieces of 50-mil thick perfluorocarbon copolymer film of the type described in Example 1 were placed in 50 milliliter beakers filled to about 20% of their depth with various amines. The film samples were placed above the level of the liquid in the beakers. The amines were then heated to various temperatures, exposing the pieces of film simultaneously to air and vapors of these compounds for from 5–10 minutes. In each instance, the film became discolored and wettable with water. Based on previous experience, this was taken as an indication that an adherable surface had been obtained.

Table IV below lists the amines used and the temperatures to which they were heated in these examples.

TABLE IV

| Ex. | Amine | Temp., °C. |
|---|---|---|
| 29 | 4,4-diaminodiphenylmethane | 280 |
| 30 | Hexamethylenetetramine | 200 |
| 31 | N¹-isopropyl-2-methyl-1,2-propanediamine | 250 |
| 32 | Hexamethylenediamine | 204 |
| 33 | p-Aminophenol | 270 |
| 34 | Tris(hydroxymethyl)aminomethane | 210 |
| 35 | p-Phenylenediamine dihydrochloride | 230 |
| 36 | p-Aminoacetanilide | 280 |
| 37 | N¹-phenyl-2-methyl-1,2-propanediamine | 230 |
| 38 | N-(2-hydroxypropyl)ethylenediamine | 250 |
| 39 | 1,4-bis(2-hydroxypropyl)-2-methylpiperazine | 250 |
| 40 | Diethanolamine | 272 |
| 41 | Triethylenetetramine | 265 |

EXAMPLE 42

A sample of polyhexafluoropropene was exposed to the vapors of boiling quinoline at a temperature of 237° C. for six minutes. The resulting treated sample, after being washed and dried, was laminated to polyethylene terephthalate film and tested. To laminate, the sample was first coated on one side with a 0.2–0.3-mil thick application of Du Pont 4684 adhesive; the solvent was evaporated; and the sample film was combined with the polyethylene terephthalate film by pressing the sandwich for 10 seconds at 340° F. and a pressure of 175 p.s.i. The peeling bond strength was 140 grams per inch of sample width.

EXAMPLES 43–45

In these examples, 2-mil thick, skived "Teflon" tape was first coated with an aqueous solution of p-phenylenediamine dihydrochloride and then heated in the presence of an oxidizing agent.

In Example 43, the tape was lead from a conventional unwind roll under tensioning devices, then in approximately 180 degree peripheral contact with each of a series of four heated, 4-inch diameter, stainless steel driven rolls mounted parallel to one another to a conventional wind-up reel. As the tape passed over the second of the four heated rolls, a De Vilbiss Type AGA spray gun applied a 20% aqueous solution of the p-phenylenediamine dihydrochloride. The spray-coated surface of the "Teflon" tape then passed around the next heated roll so that the spray-coated side was in direct contact with the heated roll. The surface temperature of the heated rolls was between 400° C. and 500° C. The linear speed of the tape through the apparatus was about 3.2 feet per minute and the spray gun applied the solution at a rate of 11 milliliters per minute.

For Example 44, the procedure was the same as for Example 43 except that the solution which was sprayed on the tape was composed of 200 milliliters of distilled water, 20 grams of the p-phenylenediamine dihydrochloride, 2 grams of ammonium perfluorocaprylate [10] and 1 gram of potassium permanganate.

For Example 45, the procedure was again repeated with 5-mil thick "Teflon" tape and some slight variations. The solution applied was prepared from 50 grams p-phenylene diamine dihydrochloride, 5 grams of "Triton" X–100 [11] and 500 milliliters of distilled water. The tape passed around the first two heated rolls, then by-passed the third heated roll. Where it by-passed the third roll, two Bunsen burners with wing tips were mounted to flame treat the coated surface of the tape before the tape proceeded to the fourth heated roll. Roll surface temperatures in this example ranged from 400° C. to 500° C. The linear speed of the tape was 2.5 feet per minute and the solution was applied at the rate of 18.5 milliliters per minute.

In Table V, the bond strengths are listed for these examples when the treated samples were laminated to copper (Example 43) in the manner described in Example 1 and laminated to steel (Examples 44 and 45) in a similar manner.

TABLE V

| Example: | Bond strength (gms./in.) |
|---|---|
| 43 | 2–3 |
| 44 | 0.5–1.5 |
| 45 | 0.5–2.0 |

EXAMPLE 46

"Quadrol" was brushed on the surface of a 25-mil thick sample of the perfluorocarbon copolymer film described in Example 1. The film was then placed, coated side down, on a hot plate at 300° C. After ten minutes the film was removed and washed in water. When laminated to polyethylene terephthalate film according to the procedure described in Example 42, the laminate exhibited a peeling bond strength of 1700–2100 grams per inch of sample width.

EXAMPLES 47–50

A paste of p-phenylenediamine dihydrochloride was made by combining 50 parts of the amine with 40 parts of water and 10 parts of "Triton" X–100. The mixture was painted on 5-mil thick samples of the perfluorocarbon copolymer film described in Example 1 for Example 47 and on 180-mil thick pieces of skived "Teflon" tape for Example 48 to a thickness of about one mil and the water evaporated from the paste. For Examples 49 and 50, 6 parts of potassium permanganate was added to the above-described paste. In Example 49 the paste was painted on the perfluorocarbon copolymer film; Example 50, on the "Teflon" tape.

The coated surfaces of the four films were then flame-treated with a Bunsen burner flame. After being washed in water and dried, the samples were laminated to polyethylene terephthalate film in accordance with the procedure described in Example 42. The resulting peeling bond strengths are listed in Table VI below for the above treated films and for two controls.

[10] Available as "APFC" from Minnesota Mining & Manufacturing Co., St. Paul, Minn.
[11] An alkyl aryl polyether alcohol prepared from t-octylphenol and ethylene oxide having 9 polyoxyethylene units in the average chain length, available from Rohm & Haas Co., Philadelphia, Pa.

TABLE VI

| Example | Film | Bond strength (gms./in.) |
|---|---|---|
| Control | Perfluorocarbon copolymer | 80– 120 |
| 47 | ---do--- | 1,900–2,400 |
| 49 | ---do--- | 3,200 |
| Control | "Teflon" | 250– 600 |
| 48 | ---do--- | 1,400–2,250 |
| 50 | ---do--- | 2,600 |

EXAMPLE 51

A 50-mil thick sample of the perfluorocarbon copolymer film described in Example 1 was dipped in molten p-phenylenediamine. The resulting coated surface was flame-treated with a Bunsen burner flame. When this treated surface was laminated to polyethylene terephthalate film in accordance with the procedure of Example 42, the laminate exhibited peeling bond strengths of 1400–1500 grams per inch of sample width.

EXAMPLES 52–58

In these examples the perfluorocarbon polymeric films were dipped into boiling amines for various periods. Examples 52 and 53 involved 2″ x 6″ .030-inch thick samples of the perfluorocarbon copolymer film of Example 1 (PFC copolymer). Example 54 involved a 50-mil thick sample of the same polymer (PFC copolymer), and Example 55 involved a 10-mil thick sample thereof. Example 56 involved a 2-mil thick sample of a film of a copolymer of tetrafluoroethylene with 2% by weight perfluoroheptene-1 (TFE/PFH copolymer). Examples 57 and 58 involved 2-mil thick samples of polyhexafluoropropene film (PHFP film).

The film, the amine and its boiling temperature, the oxidizing agent if not air, the length of treatment and the bond strengths (where available) obtained according to the test procedure of Example 42 are presented in Table VII below.

TABLE VII

| Example | Film | Amine | Temp., °C. | Time (minutes) | Bond strength (gms./in.) |
|---|---|---|---|---|---|
| Control | PFC copolymer | None | | None | 80– 90 |
| 52 | ---do--- | "Quadrol" | 270 | 1 | 580– 800 |
| 53 | ---do--- | ---do--- | 270 | 15 | 1,700–2,100 |
| 54 | ---do--- | N-(3-aminopropyl) morpholine [1] | 225 | 10 | 930 |
| 55 | ---do--- | N-phenylmorpholine | 270 | [2] 6 | Adherable |
| Control | TFE/PFH copolymer | None | | None | 70 |
| 56 | ---do--- | "Quadrol" | 270 | 3 | 360 |
| Control | PHFP | None | | None | 50 |
| 57 | PHFP | Quinoline | 237 | 0.5 | 90 |
| 58 | PHFP | Dimethylaniline [3] | 194 | 3 | 350 |

[1] Also containing 2% by weight sodium dichromate.
[2] Dipped in for one minute, then removed and held in air 15–30 seconds—repeated six times.
[3] Also containing 2% by weight potassium permanganate.

The present invention enables one to use the polymeric perfluorocarbon resins as protective linings for containers for corrosive liquids; as coverings for structures that are to be exposed to wind, weather, temperature variations, etc., in various laminates and as flexible films for packaging purposes.

As many widely different embodiments of this invention may be made without departing from the spirit and scope thereof, it is understood that the invention should not be limited except to the extent defined in the appended claims.

What is claimed is:

1. A process for treating polymeric perfluorocarbon structures which comprises heating at least one surface of said polymeric structure to a temperature of at least 150° C. in the presence of a composition consisting essentially of an oxidizing agent and an amine selected from the group consisting of: primary aliphatic amines, primary aliphatic diamines, primary alicyclic amines, primary aromatic amines, primary aromatic diamines, dialkyl amines, diaryl amines, alkyl aryl amines, trialkyl amines, triaryl amines, alkyldiaryl amines, aryldialkyl amines, pyrrole, pyrrolines, pyrrolidine, indole, piperidine, piperazine, morpholine, pyridine, quinoline, phenanthroline, pyrazine, melamine, diallyl melamine, and N-substituted derivatives of pyrrole, pyrrolines, pyrrolidine, indole, piperidine, piperazine and morpholine wherein the substituent is selected from the group consisting of aryl, hydroxy alkyl and amino alkyl radicals.

2. A process as in claim 1 wherein the polymeric perfluorocarbon is polytetrafluoroethylene.

3. A process as in claim 1 wherein the polymeric perfluorocarbon is polyhexafluoropropene.

4. A process as in claim 1 wherein the polymeric perfluorocarbon is a copolymer of tetrafluoroethylene and a compound copolymerizable with tetrafluoroethylene.

5. A process as in claim 1 wherein the polymeric perfluorocarbon is a copolymer of tetrafluoroethylene and hexafluoropropene.

6. A process as in claim 1 wherein the polymeric perfluorocarbon is a copolymer of tetrafluoroethylene and perfluoroheptene-1.

7. A continuous process for treating a flexible structure of a perfluorocarbon polymer which comprises applying to at least one surface of said structure a composition consisting essentially of an amine selected from the group consisting of: primary aliphatic amines, primary aliphatic diamines, primary alicyclic amines, primary aromatic amines, primary aromatic diamines, dialkyl amines, diaryl amines, alkyl aryl amines, trialkyl amines, triaryl amines, alkyldiaryl amines, aryldialkyl amines, pyrrole, pyrrolines, pyrrolidine, indole, piperidine, piperazine, morpholine, pyridine, quinoline, phenanthroline, pyrazine, melamine, diallyl melamine, and N-substituted derivatives of pyrrole, pyrrolines, pyrrolidine, indole, piperidine, piperazine and morpholine wherein the substituent is selected from the group consisting of aryl, hydroxy alkyl and amino alkyl radicals; subjecting said surface to a temperature of at least 150° C. and an oxidizing agent while maintaining said amine in contact with said surface; washing said treated surface and drying the structure.

8. A continuous process as in claim 7 wherein said flexible structure is a self-supporting film.

9. A continuous process as in claim 7 wherein said flexible structure is a fabric.

10. An article of manufacture comprising a shaped structure produced by treating the surface of a shaped structure of a polymeric perfluorocarbon resin with a composition consisting essentially of an oxidizing agent and an amine selected from the group consisting of: primary aliphatic amines, primary aliphatic diamines, primary alicyclic amines, primary aromatic amines, primary aromatic diamines, dialkyl amines, diaryl amines, alkyl aryl amines, trialkyl amines, triaryl amines, alkyldiaryl amines, aryldialkyl amines, pyrrole, pyrrolines, pyrrolidine, indole, piperidine, piperazine, morpholine, pyridine, quinoline, phenanthroline, pyrazine, melamine, diallyl melamine, and N-substituted derivatives of pyrroles, pyrrolines, pyrrolidine, indole, piperidine, piperazine and morpholine wherein the substituent is selected from the group consisting of aryl, hydroxy alkyl and amino alkyl radicals, and a layer of material subject to corrosion having a surface adhesively bonded to said shaped structure.

11. The article of claim 10 wherein the polymeric perfluorocarbon is polytetrafluoroethylene.

12. The article of claim 10 wherein the polymeric perfluorocarbon is polyhexafluoropropene.

13. The article of claim 10 wherein the polymeric perfluorocarbon is a copolymer of tetrafluoroethylene and a compound copolymerizable with tetrafluoroethylene.

14. The article of claim 10 wherein the polymeric perfluorocarbon is a copolymer of tetrafluoroethylene and hexafluoropropene.

15. The article of claim 10 wherein the polymeric perfluorocarbon is a copolymer of tetrafluoroethylene and perfluoroheptene-1.

16. The article of claim 10 wherein the shaped structure is a film.

17. The article of claim 10 wherein the shaped structure is a fabric.

18. A laminated structure comprising a first sheet of material having at least one continuous surface and a sheet of a polymeric perfluorocarbon resin having a continuous surface treated with a composition consisting essentially of an oxidizing agent and an amine selected from the group consisting of: primary aliphatic amines, primary aliphatic diamines, primary alicyclic amines, primary aromatic amines, primary aromatic diamines, dialkyl amines, diaryl amines, alkyl aryl amines, trialkyl amines, triaryl amines, alkyldiaryl amines, aryldialkyl amines, pyrrole, pyrrolines, pyrrolidine, indole, piperidine, piperazine, morpholine, pyridine, quinoline, phenanthroline, pyrazine, melamine, diallyl melamine, and N-substituted derivatives of pyrrole, pyrrolines, pyrrolidine, indole, piperidine, piperazine and morpholine wherein the substituent is selected from the group consisting of aryl, hydroxy alkyl and amino alkyl radicals facing at least one continuous surface of said first sheet, said continuous surfaces being adhesively bonded at their interface.

19. A laminated structure comprising a first sheet consisting essentially of metals selected from the group consisting of aluminum, copper, magnesium, nickel, tin, iron, lead and alloys thereof having a continuous surface and a sheet of a polymeric perfluorocarbon resin having a continuous surface bonded to said continuous surface of the first sheet, said surface of the polymeric perfluorocarbon resin nearest said continuous surface of the first sheet having been treated with a composition consisting essentially of an oxidizing agent and an amine selected from the group consisting of: primary aliphatic amines, primary aliphatic diamines, primary alicyclic amines, primary aromatic amines, primary aromatic diamines, dialkyl amines, diaryl amines, alkyl aryl amines, trialkyl amines, triaryl amines, alkyldiaryl amines, aryldialkyl amines, pyrrole, pyrrolines, pyrrolidine, indole, piperidine, piperazine, morpholine, pyridine, quinoline, phenanthroline, pyrazine, melamine, diallyl melamine, and N-substituted derivatives of pyrrole, pyrrolines, pyrrolidine, indole, piperidine, piperazine and morpholine wherein the substituent is selected from the group consisting of aryl, hydroxy alkyl and amino alkyl radicals.

References Cited in the file of this patent

UNITED STATES PATENTS

| | | |
|---|---|---|
| 2,392,389 | Joyce | Jan. 8, 1946 |
| 2,788,306 | Cox et al. | Apr. 9, 1957 |
| 2,789,063 | Purvis et al. | Apr. 16, 1957 |
| 2,809,130 | Rappaport | Oct. 8, 1957 |
| 2,828,236 | West | Mar. 25, 1958 |
| 2,878,196 | Buffington | Mar. 17, 1959 |